United States Patent
Pudar

(10) Patent No.: US 8,055,540 B2
(45) Date of Patent: Nov. 8, 2011

(54) VEHICLE RADIO SYSTEM WITH CUSTOMIZED ADVERTISING

(75) Inventor: Nick J Pudar, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 3508 days.

(21) Appl. No.: 09/870,377

(22) Filed: May 30, 2001

(65) Prior Publication Data

US 2002/0184091 A1 Dec. 5, 2002

(51) Int. Cl.
*G06Q 30/00* (2006.01)
(52) U.S. Cl. .................................... 705/14.62
(58) Field of Classification Search ........... 705/14, 705/14.62
See application file for complete search history.

(56) References Cited

U.S. PATENT DOCUMENTS

| | | | |
|---|---|---|---|
| 5,524,051 A | 6/1996 | Ryan | 380/9 |
| 5,590,195 A | 12/1996 | Ryan | 380/9 |
| 5,664,948 A * | 9/1997 | Dimitriadis et al. | 434/307 R |
| 5,751,806 A | 5/1998 | Ryan | 380/9 |
| 5,774,170 A * | 6/1998 | Hite et al. | 725/34 |
| 5,809,472 A | 9/1998 | Morrison | 704/500 |
| 5,815,671 A | 9/1998 | Morrison | 395/200.77 |
| 5,956,629 A | 9/1999 | Morrison | 455/166.2 |
| 6,163,683 A | 12/2000 | Dunn et al. | 455/151.1 |

OTHER PUBLICATIONS

Pending application: U.S. Appl. No. 09/745,585.

* cited by examiner

*Primary Examiner* — James W Myhre
(74) *Attorney, Agent, or Firm* — Anthony L. Simon; Reising Ethington P.C.

(57) ABSTRACT

A radio broadcast system includes a vehicle-based radio system that receives radio broadcasts via digital satellite transmission from a transmitting facility and provides two-way communication with a vehicle communications central facility. The transmitting facility broadcasts a number of different channels of programming content (music, news, etc.) along with one or more separate streams of radio advertisements. The advertisements are received by the vehicle radio system which selects and stores certain advertisements targeted to the vehicle user based on user or vehicle data. The broadcasted radio streams received by the vehicle radio system contain intermittent advertising slots and the system monitors the channel selected by the vehicle operator for markers that identify these advertising slots. Once a marker is detected, one of the stored advertisements is accessed and inserted into the advertising slot for playback as a part of the selected broadcast stream.

17 Claims, 5 Drawing Sheets

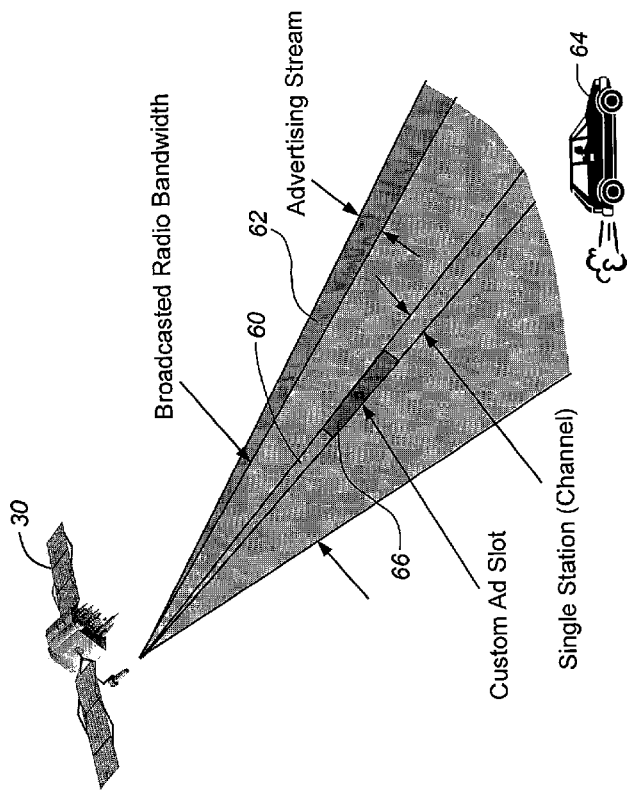

VEHICLE RADIO SYSTEM WITH CUSTOMIZED ADVERTISING

TECHNICAL FIELD

This invention relates generally to radio broadcasting and, more particularly, to vehicle radio systems and advertising over vehicle radio systems.

BACKGROUND OF THE INVENTION

Historically, vehicle radio systems have been designed to receive radio broadcasts at different frequencies and within different frequency bands, with a tuner being used to select among the different frequencies and play audio content from the radio broadcast received at the selected frequency. The radio broadcasts can include a variety of different programming content including, for example, news, music, and talk shows. Commercial radio stations use advertisements interspersed throughout the programming content as a source of revenue. These radio advertisements are not specifically targeted to each of the end users; rather, they are targeted only generally, if at all, based on such things as the time of day, content of the contemporaneous programming content, and demographics of the listening audience derived from survey data. These factors are also typically used to determine how much to charge the advertisers for broadcasting the advertisement.

Traditional AM and FM radio broadcasts by a radio station cover only a limited geographic area depending on the strength of the broadcasted signal and the use of repeaters. Much of the programming content for these broadcasts is locally produced or compiled and then broadcasted only within the area covered by the particular radio station. For more widespread distribution of programming content, syndication has become more common, with the syndicated content being transmitted to various, geographically dispersed radio stations which then retransmit that syndicated program. Local advertising may be inserted within this content by the individual radio stations. Television networks provide programming content in a similar fashion, with the content containing advertising slots that can be used by the local affiliates to insert regional advertising.

More recently, other approaches that permit more localized programming and advertising have been proposed. See, for example, U.S. Pat. No. 6,163,683 to J. M. Dunn et al. which discloses a broadcast data radio system that uses cellular towers to implement a virtual radio station that is not limited by the geographic range of any single transmitting station. The system broadcasts both analog and digital programming content which can be locally stored and interleaved with broadcasted programming content. This permits the user to maintain reception of the virtual radio station's programming when crossing regional boundaries from one region to another while receiving advertising having locally-specific content.

One disadvantage of these existing approaches to radio broadcasting of programming and advertising is that they do little to improve the targeting of advertising to listeners. Another disadvantage is that they do not provide any means to confirm that the advertising has been delivered to the listener. Accordingly, it is a general object of the invention to enable customization of advertising for vehicle occupants in a manner that better targets the advertising to the listener. It is also an object of the invention to provide a system that can provide confirmation back to the advertiser that a particular advertisement has been played for the listener.

SUMMARY OF THE INVENTION

In accordance with the present invention, there is provided a radio system for a vehicle to provide broadcasted radio programming and advertising content to an occupant of a vehicle. The radio system includes a vehicle radio, a radio broadcast receiver having an antenna for receiving two or more radio broadcast streams, and an advertising control unit having a recording device which stores radio advertisements received from the radio broadcast receiver. The vehicle radio has an input for receiving audio data and at least one output for providing audio signals representative of the received audio data. A first one of the radio broadcast streams includes radio advertisements and a second one of the radio broadcast streams includes audio content that contains intermittent advertising slots each identified by a marker contained with that broadcast stream. The radio broadcast receiver is coupled to the input of the vehicle radio to provide the vehicle radio with the received audio content. The advertising control unit is connected to the radio broadcast receiver to receive at least some of the radio advertisements contained in the first radio broadcast stream. Upon receipt of one of the markers contained within the second broadcast stream, the advertising control unit is operable to access one of the stored radio advertisements, with the accessed radio advertisement being inserted into the advertising slot identified by the received marker so that the accessed radio advertising is included within the audio content sent to the input of the vehicle radio.

In accordance with another aspect of the invention, there is provided a method of delivering advertising content to a vehicle occupant using a vehicle radio. The method includes the steps of receiving a radio advertisement, storing the radio advertisement in memory, receiving a radio broadcast stream, monitoring the received radio broadcast stream for marker data indicative of an advertising slot within the radio broadcast stream, and playing the radio broadcast stream using the vehicle radio. In response to detecting the marker data, the radio advertisement is accessed from memory and played in the advertising slot using the vehicle radio. For both the radio system and method of the invention, advertisement data associated with each received advertisement is preferably used to select the advertisements to be stored and played back, with the advertisement data being compared with user and/or vehicle data concerning the owner or principal driver of the vehicle for purposes of making the appropriate selections of advertisements. This permits a customized approach to advertising to the vehicle user. Preferably, confirmation of the playback of the advertisement is sent from the vehicle using a vehicle communications device and this confirmation is used for billing of the advertiser.

In accordance with another aspect of the invention, the radio system and method are implemented as a part of a radio broadcast system that additionally includes one or more radio broadcast transmitting facilities and a vehicle communications central facility. The transmitting facilities supply the broadcasted radio streams preferably by way of digital satellite transmission and the central facility receives the confirmations of advertisement playback and provides a means of supplying the user data to the vehicle radio system.

BRIEF DESCRIPTION OF THE DRAWINGS

Preferred exemplary embodiments of the invention will hereinafter be described in conjunction with the appended drawings, wherein like designations denote like elements, and wherein:

FIG. 4 is a diagrammatic depiction of broadcasted radio streams used to provide radio programming and advertising to the vehicle radio system of FIG. 1;

FIG. 5 is a diagram showing the content of a single one of the radio broadcast streams of FIG. 4;

FIG. 6 is a diagram showing the content of the advertising broadcast stream of FIG. 4;

DETAILED DESCRIPTION OF THE PREFERRED EMBODIMENTS

Figure 1:
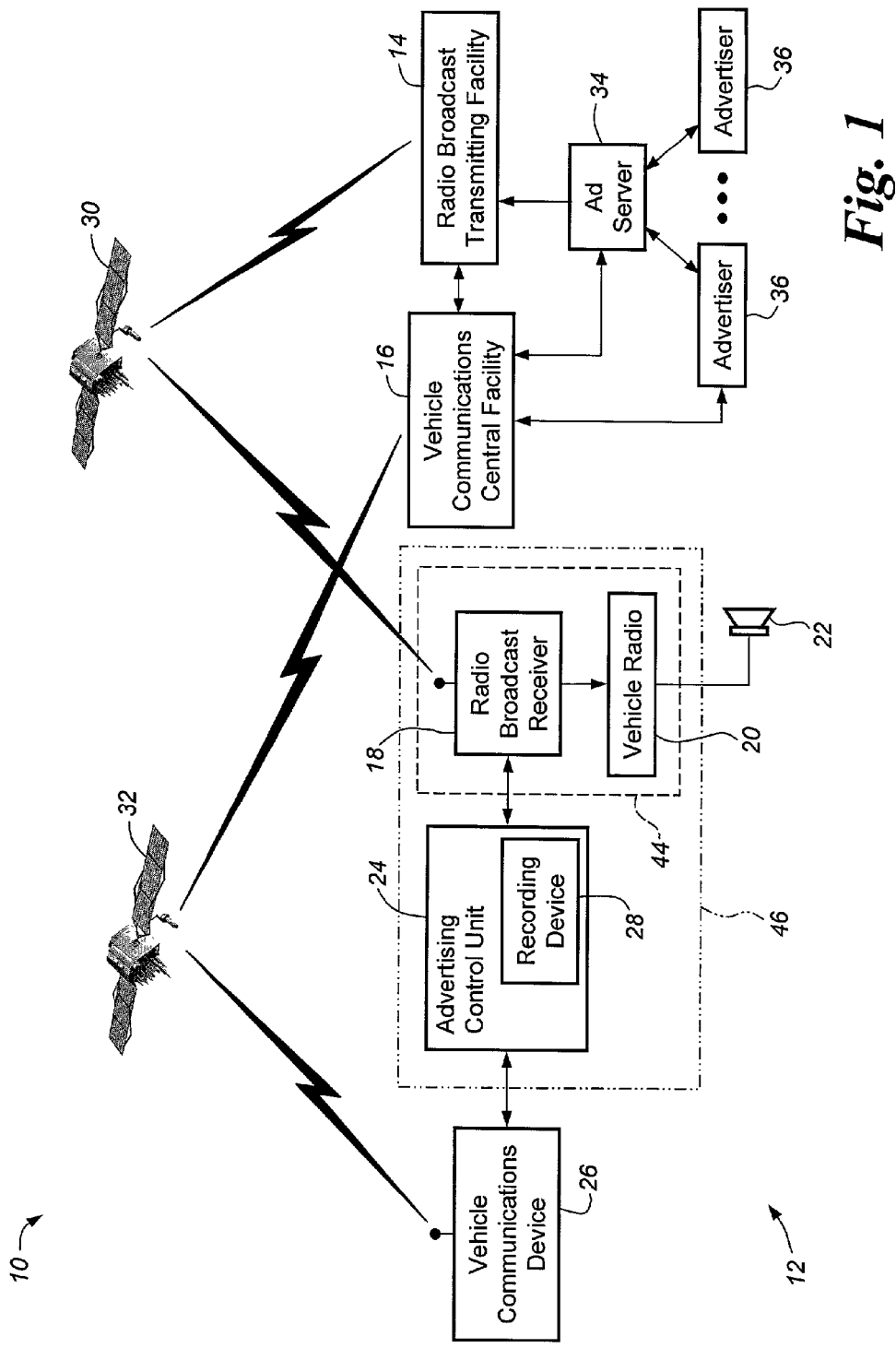
FIG. 1 is a block diagram depicting a preferred embodiment of a radio broadcast system of the invention.

Referring now to FIG. 1, there is shown a radio broadcast system 10 of the present invention which in general includes a vehicle-based transmission/reception system 12 that receives radio broadcasts from a transmitting facility 14 and provides two-way communication with a vehicle communications central facility 16. The vehicle system 12 includes a radio broadcast receiver 18, a vehicle radio 20 driving one or more speakers 22, an advertising control unit 24, and a vehicle communications device 26. In general, transmitting facility 14 broadcasts a number of different channels of programming content (music, news, etc.) along with one or more separate streams of radio advertisements, all of which are received by the radio broadcast receiver 18. The received advertisements are provided to the advertising control unit (ACU) 24 which selects certain advertisements using one or more criteria discussed below and stores the selected advertisements on a recording device 28 that is included with the ACU 24. The broadcasted channels, or streams, of programming content received by receiver 18 contain intermittent advertising slots and the system monitors the channel selected by the vehicle operator for markers that identify these advertising slots. Once a marker is detected, the ACU 24 accesses one of the stored advertisements from the recording device 28 and provides the accessed advertisement to the receiver 18 for insertion into the advertising slot.

As shown, the broadcasted streams of radio programming and the remote vehicle communications can be supplied by way of digital satellite transmission using, for example, a first geosynchronous satellite 30 for broadcasting the radio programming and a second such satellite 32 for handling the two-way vehicle communications. As will be apparent, the satellite radio broadcast and vehicle communications could be handled using a single satellite and single communications path; however, they are shown separately here since separate commercial systems exist today that can handle these respective tasks. In particular, the satellite radio broadcast transmission of the radio programming and advertising streams can be implemented via XM Satellite Radio™ which is available from XM Radio of Washington, D.C. (www.xmradio.com), whereas the two-way vehicle communications can be implemented via the OnStar™ system available through General Motors of Detroit, Mich. (www.onstar.com). The XM Satellite Radio™ system includes the transmitting facility 14, satellite 30, and radio broadcast receiver 18. The OnStar™ system includes the vehicle communications device 26, satellite 32, and the vehicle communications central facility 16. The hardware and software modifications of these systems necessary to implement the invention described herein will be apparent to those skilled in the art based on the functions and operations of the system 10 that are described herein. All such modifications are all well within the level of skill in the art and no further discussion of those modifications is therefore necessary.

Apart from storing and providing selected advertisements for insertion into the radio broadcast stream, ACU 24 also provides a confirmation of the playback of the selected advertisement by providing suitable telemetry data to the communications device 26 for transmission back to the central facility 16. This permits billing of advertisers on a per-listen basis, rather than based on survey data as has been typically used in the past. The telemetry data provided by ACU 24 can include identification data that uniquely identifies the associated advertisement and the vehicle system 10 can be configured so that the confirmation is sent back to the central facility 16 only when the advertisement is played in its entirety so that the advertiser can be guaranteed that the advertisement was actually played with the vehicle running and the radio on. Occupant sensors of various types are becoming more common (e.g., seatbelt closure detection, seat pressure detection) and these sensors as well as other vehicle operational parameters can also be provided to the vehicle system 12 to provide improved verification that the advertisement was played back with at least one occupant present.

The advertisements can be supplied to the transmitting facility 14 in a conventional manner or can be supplied via an advertising server 34, as shown in FIG. 1. This server is accessible by advertisers 36 over a global computer network such as the Internet, with access either being publicly available or via a VPN or other secure connection. In use, an advertiser 36 would access the server 34 and be presented with a web interface that permits it to supply the advertisement using any desired audio format (.mp3, etc.). The web interface can be used to give advertisers the ability to select desired time slots and other attributes of advertisement playback (such as frequency, priority, number of repeats, etc.) as will be described below. Billing of advertisers can be carried out directly as illustrated by the connection in FIG. 1 between the central facility 16 and advertiser 36, or can be handled via advertising server 34.

Figure 2:
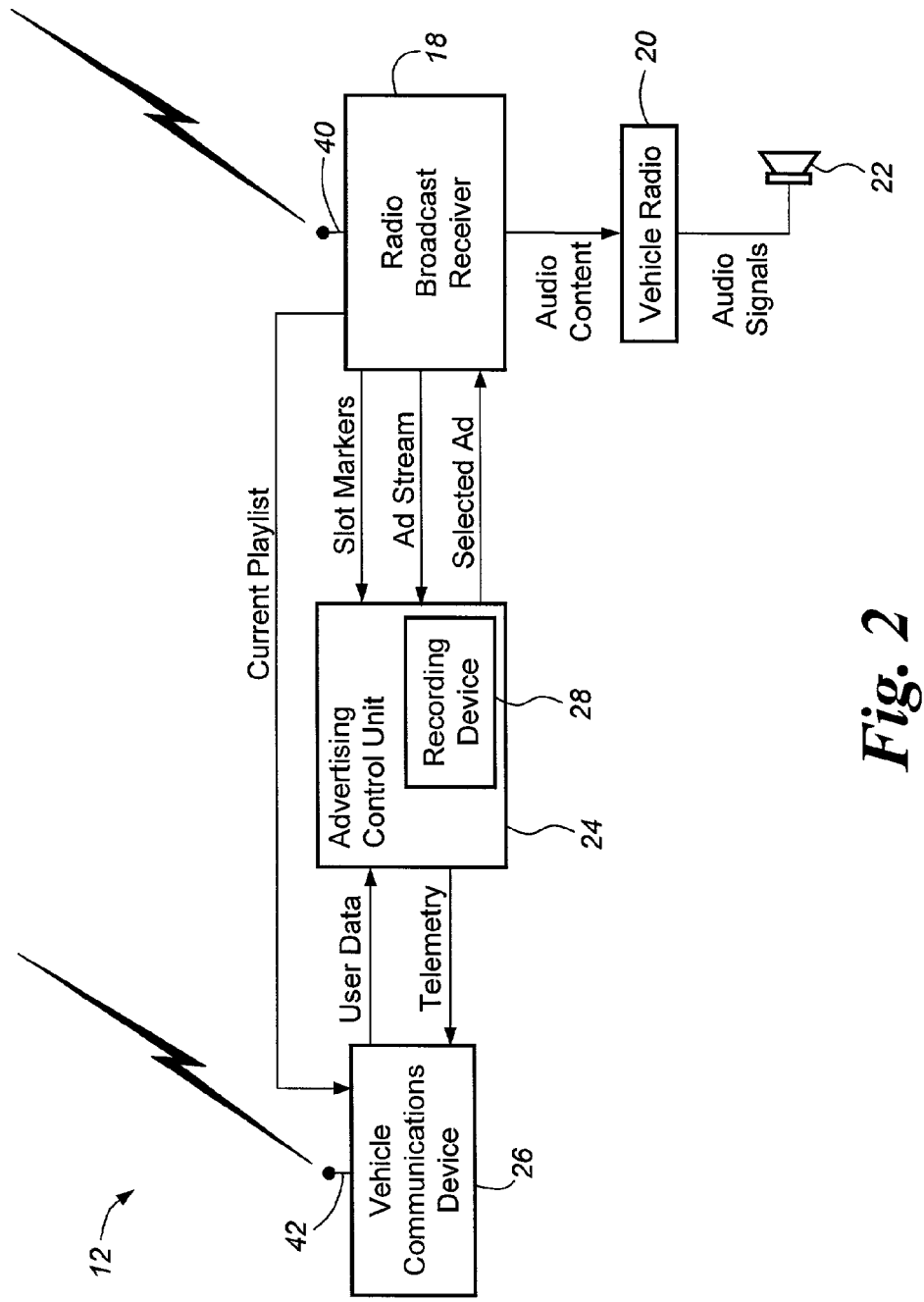
FIG. 2 is a block diagram of the vehicle radio system of FIG. 1 and showing further details of its construction.

Referring now to FIG. 2, further details of the vehicle system 12 will now be described. The broadcast streams of radio programming and advertising are received by radio broadcast receiver 18 via an antenna 40. Advertisements contained within the advertising stream are supplied to the ACU 24 with certain ones of the advertisements being stored in the recording device 28. Selection of which advertisements are to be stored rather than ignored is based on one or more advertisement data items that are received along with the advertisements. As will be discussed in greater detail below, this advertisement data includes data concerning one or more attributes of the advertisement that is compared to either vehicle data (relating to the vehicle make and/or model) or user data (e.g., owner/driver demographic information) to determine whether the associated advertisement should be stored. The vehicle data and/or the user data can be programmed in at installation of the system or supplied later via communication device 26. However obtained, the vehicle and/or user data is then compared with the advertisement data obtained from the advertising stream to determine whether each particular advertisement should be stored or ignored.

The stored advertisements are available for use by the radio broadcast receiver 18 in filling custom advertising slots within the broadcast stream selected by the vehicle user via the standard radio controls. As indicated in FIG. 2, the markers contained in the radio broadcast stream are provided to the ACU 24 and, upon detecting one of the markers, ACU 24 accesses one of the stored radio advertisements and sends it to the receiver 18 where it is inserted into the advertising slot identified by the marker. It will be appreciated that the receiver 18 can itself be configured to monitor for the markers and, upon detection of one of the markers, transmit a request to the ACU 24 for an advertisement (rather than transmitting the markers themselves to the ACU). However implemented, the radio broadcast stream containing the inserted advertisement is then sent by the receiver 18 as audio data to an input of the vehicle radio 20, which generates suitable audio signals in a conventional manner that are sent to the speakers 22 via an output of the radio 20. Once the advertisement has been played, the ACU 24 sends a confirmation to the communications device 26 which is then transmitted via an antenna 42 to the satellite 32 and then back to the central facility 16.

Referring again briefly to FIG. 1, the circuit topology shown for the vehicle system 12 represents an implementation of the invention that provides good utilization of the existing XM Satellite Radio™ and OnStar™ systems. That is, the radio broadcast receiver 18 together with the vehicle radio 20 can be a single integrated unit 44, as exists today for use with the XM Satellite Radio™ system. The communications device 26 can be a separate unit as is in use today within many vehicles as part of the OnStar™ system. The ACU 24 is thus shown as a separate unit that interfaces with both the digital satellite receiver 18 and the digital satellite communications device 26, and that provides most of the additional functionality and hardware necessary to implement the invention. However, as will be appreciated by those skilled in the art, any or all of the various components of vehicle system 12 can be implemented together as a single integrated unit. Thus, as shown at 46 in FIG. 1, the ACU 24 together with its recording device 28 can be integrated in with the receiver 18 and radio 20 to thereby provide a single unit radio system. Similarly, the communications device 26 can be integrated in with the ACU 24, receiver 18, radio 20, or any combination of these.

Figure 3:
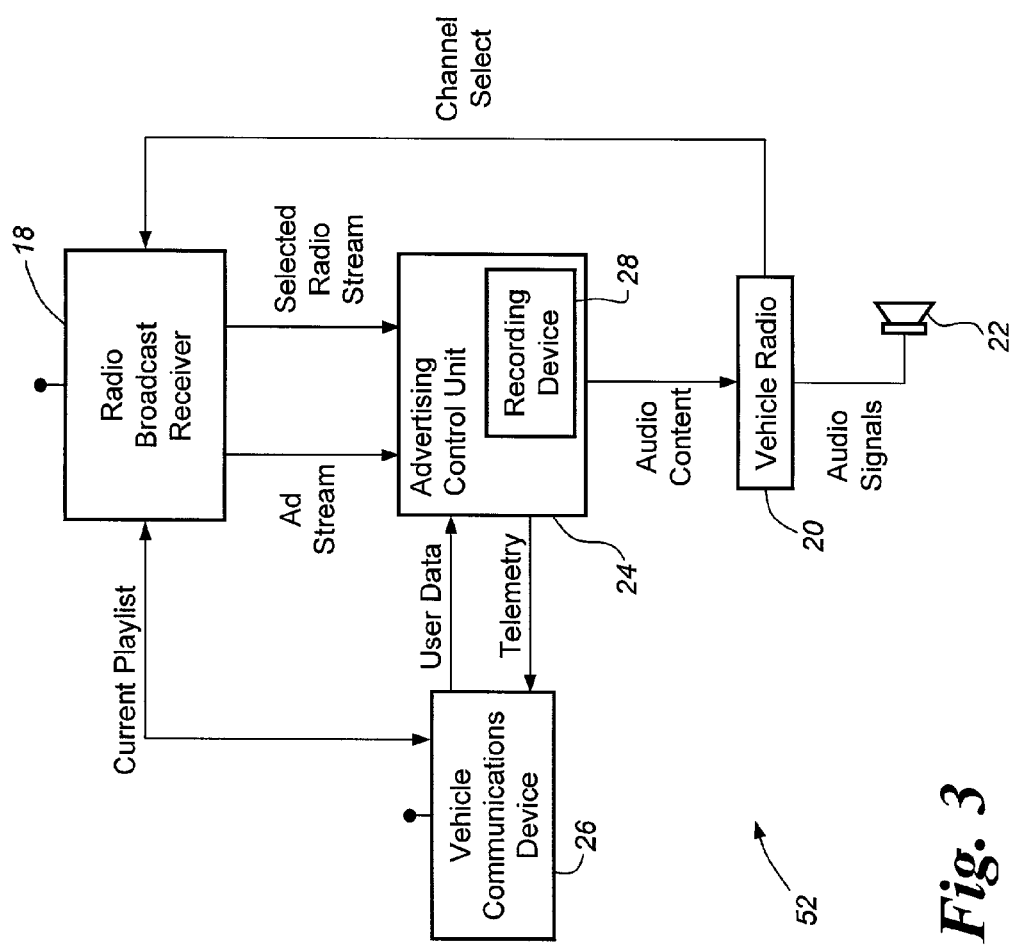
FIG. 3 is an alternative embodiment of the vehicle radio system of FIG. 2.

Apart from integrating the various vehicle-based components of FIGS. 1 and 2 together into a single unit, it will be appreciated that the invention can be implemented using other circuit arrangements to achieve the same functionality. For example, FIG. 3 depicts an alternative embodiment 52 in which the ACU 24 is interposed between the radio broadcast receiver 18 and the vehicle radio 20 so that the radio channel selected by the vehicle user is passed through the ACU 24. The ACU 24 thus handles both selection and insertion of advertising into the custom advertising slots contained within the selected channel. As shown, the channel select signal is provided from the radio 20 to the receiver 18 so that the vehicle user can specify which of the available radio broadcast streams he or she wishes to hear. This channel select signal could alternatively be routed to the receiver 18 through the ACU 24. The selected radio broadcast stream is then provided by the receiver 18 to the ACU 24 along with the one or more advertising streams. Although shown as separate connections, it will be appreciated that these two streams could be provided simultaneously or in an interleaved fashion via a single connection.

ACU 24 examines the advertisement data received with each of the advertisements, determining which of the advertisements should be stored. At the same time, ACU 24 also monitors the selected radio stream for markers and, when detected, accesses one of the stored advertisements and inserts it into the advertising slot identified by the marker. The resulting audio content is then sent to the radio 20 as described above in connection with the first embodiment. Data exchange with the vehicle communications device 26 can also be carried out in the same manner discussed above.

Turning now to FIGS. 4-8, the structure and content of the advertising and radio broadcast streams received from satellite 30 will now be described in greater detail. As shown in FIG. 4, the satellite 30 transmits a plurality of streams or channels of audio content, including a number of different channels 60 containing programming content and at least one channel 62 containing advertisements and associated data. All of these channels of data are received in the vehicle 64 by its radio broadcast receiver. As discussed above, known, existing technology can be used for this broadcast communication of the programming and advertising content. Each channel can be a different station having a different focus in terms of its music or other substantive content. A single channel 60 of radio programming is shown and, as indicated, the programming content includes intermittent custom advertising slots 66 that can be filled by one of the advertisements that have been previously received via the advertising stream 62. As will be appreciated, the advertising slot 66 can be empty when received by the vehicle 64 or can include an in-line default advertisement that is used in the event that no advertisements are stored and available on the recording device. Where a stored advertisement is available, it is accessed and substituted for the default advertisement. Preferably, insertion of the accessed advertisement is performed on the fly as the radio stream is received and passed through the system. However, if necessary or desired, the radio stream can be buffered or time delayed.

Figures 7, 8, 9:
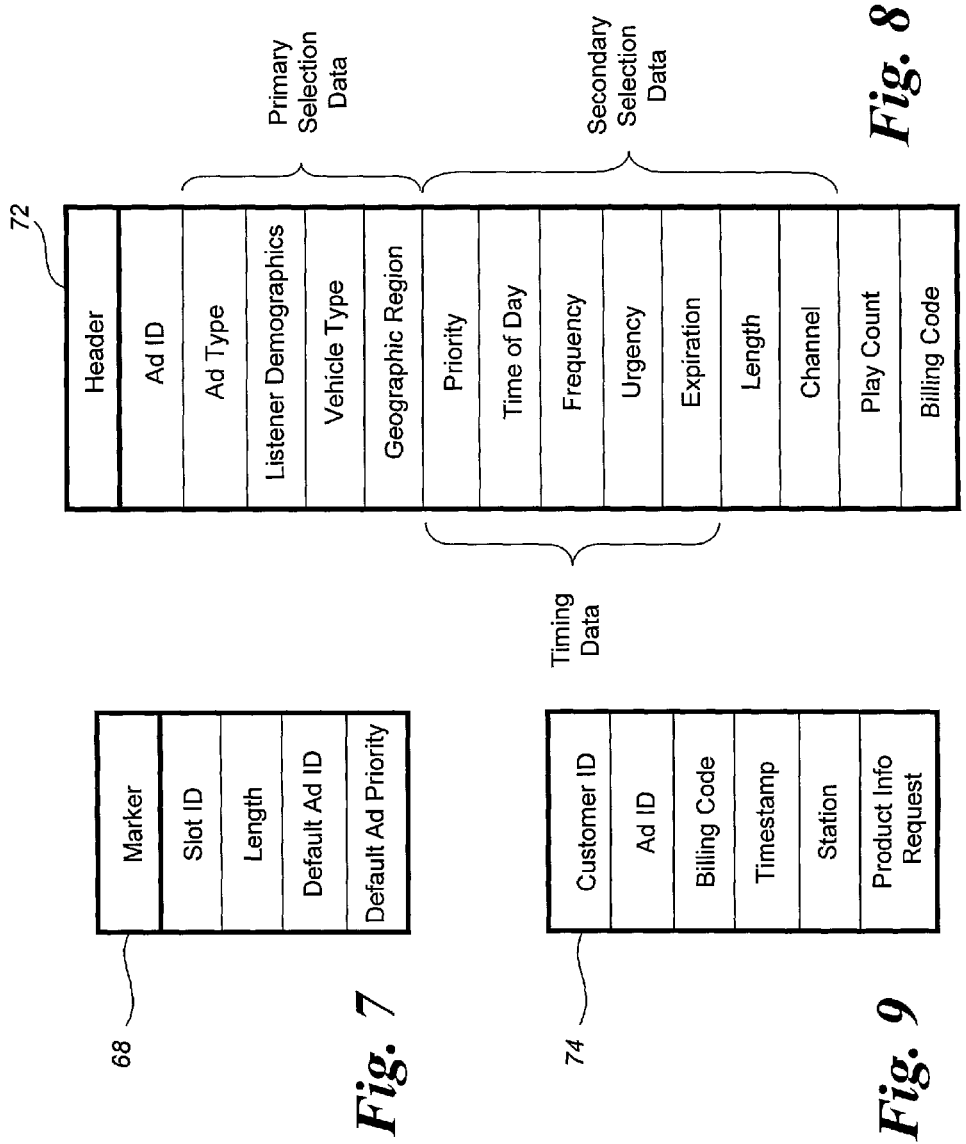
FIG. 7 depicts one of the markers and associated data used to identify an advertising slot in the radio broadcast stream of FIG. 5.
FIG. 8 depicts one of the advertisement headers and associated advertisement data used to identify a radio advertisement in the radio broadcast stream of FIG. 6.
FIG. 9 depicts data used to report back a confirmation of the successful playback of one of the radio advertisements.

The custom advertising slot 66 is shown in FIG. 5. It includes a marker 68 identifying the start of the advertising slot. When used over a digital transmission system such as is used by satellite 30 and the receiver 18, the marker 68 can constitute a particular code that can be recognized by the receiver 18 or ACU 24. As shown in FIG. 7, the marker can be accompanied by various pieces of data, including for example: a Slot ID that provides a unique or semi-unique identification of the advertising slot 66; Length data that specifies the time length of the slot (e.g., 15 seconds, 30 seconds); a Default Ad ID which can be reported back to the central facility 16 for billing or other reasons in the event the default advertisement is not replaced with a stored advertisement; and a Default Ad Priority which can be used to determine whether to maintain the default advertisement or replace it with one stored in memory. Thus, for example, whereas a default advertisement would normally be replaced with a stored and presumably better targeted advertisement, the Priority field could be used so that a default advertisement having a relatively high priority would not be replaced with a stored advertisement having lower priority. In this regard, the system can be designed so that priority reflects the relative price charged to the advertiser with higher priority bringing with it a higher advertising price and this use of priority in selecting advertisements allows the system to help maximize revenue by choosing the higher priced advertisements from among competing candidate advertisements for a particular advertising slot.

The content of advertising stream 62 is shown in FIG. 6. The stream contains a series of advertisements 70 that can be interleaved with other information such as new control programming for any of the components of the vehicle system 12. The new control programming can be used, for example, in the event that new data fields are added to the advertisement data and user data for such purposes as providing more specific targeting of the advertisements. Associated with each radio advertisement 70 is a header 72 that includes advertisement data used by the vehicle system 12 in selecting advertisements for storage and playback. The header can be implemented as a code in the same manner as the markers used in the different channels of programming content.

The advertisement data contained in the header 72 is shown in FIG. 8. The advertisement data can include a number of different types of data used for different purposes. For example, the advertisement data can include an Ad ID which constitutes identification data that uniquely identifies its associated advertisement from other advertisements contained in the advertising stream. Following playback of the advertisement, this Ad ID can be incorporated into the telemetry data provided to vehicle communications device 26 (and then back to central facility 16) for purposes of confirming the playback and initiating billing for the advertisement. The advertisement data can also include selection data that is used to select certain ones of the advertisements for storage on the recording device 28 and for subsequent playback within an advertising slot 66. This selection data is compared with user and/or vehicle data stored in the vehicle system to determine which of the received advertisements should be stored and played back. The selection data includes primary selection data and secondary selection data, with the primary selection data being used to determine which of the received advertisements are to be stored rather than ignored, and the secondary selection data being used to select among the previously stored advertisements when an advertising slot is detected. The advertisement data can also include additional data items such as a Play Count that specifies the total number of times that the associated advertisement should be played before being deleted, and a Billing Code that contains billing information that can be included in the telemetry data that is returned to the central facility 16. When the Play Count is used, the vehicle system increments a counter each time the advertisement is played and that counter is compared to the Play Count for the advertisement so that it is periodically replayed until the counter equals the Play Count. After that, the advertisement is discarded.

The selection data is compared to either vehicle data, user data, or both to decide which advertisements are to be stored and played back. The vehicle and/or user data stored in the system is thus used as a way of identifying certain attributes of the vehicle owner or principal driver. This allows customization of the advertising presented to the user. The vehicle data allows substantially reliable assumptions to be made about the vehicle user that can be used to decide what advertising should be stored for later playback. For example, demographic assumptions can be made for advertising purposes based on the relative prices of different makes and models of vehicles. This vehicle data itself can be stored on the recording device 28 and then used to select advertisements from the incoming stream. Alternatively, rather than storing and subsequently using the raw vehicle data itself, this vehicle data can be used to generate metadata representing a categorization of the vehicle user by, for example, economic or other demographic factors. In this way, the vehicle data is converted into user data.

Preferably, the user data that is used to select advertisements is not obtained by assumptions based on the vehicle data, but by actual data concerning the owner or principal driver of the vehicle. This actual user data permits even better customization of the presented advertising because it can include specific demographic and other attributes of the vehicle driver. This information can be obtained for the principal driver at vehicle purchase or can be obtained or even simply updated at any time via the communication link between the central facility 16 and vehicle communications device 26. For consumers, the information can be provided via a networked computer (such as the advertising server 34) using form-based input to allow the consumer to specify his or her demographic information and preferences. This data can then be transmitted to the vehicle system 12. As with the vehicle data, the actual user data can be used to classify the driver into various demographic categories using pre-established metadata values that can be directly compared to similar metadata values associated with each advertisement. Regardless of whether this user data is provided in the form of metadata or not, it is stored in the vehicle system such as by recording it in the memory 28.

The primary selection data shown in FIG. 8 includes data items that are used to decide which of the advertisements contained in the incoming advertising stream should be stored on the recording device. This data can include an Ad Type, Listener Demographics, Vehicle Type, and Geographic Region to name only a few possibilities. The Ad Type can be metadata indicative of the content of the advertisement, specifying, for example, either broad categories of subject matter (financial, political, healthcare, food) or more specific categories (investment services, local elections, physician services, soft drinks). Multiple Ad Type data items can be included where the advertisement spans more than a single category. This Ad Type metadata can be compared with the user data which contains one or more metadata values selected from the same standard listing of metadata values used for categorizing the advertisements. In this way, comparison of the primary selection data and user data is simple and requires no complex processing to find an appropriate advertisement. As with the Ad Type, the Listener Demographics contain one or more metadata items; however, these data items specify particular attributes of the category of listeners to which the advertisement is targeted. These data items can include metadata values relating to particular demographic groups (based on, for example, economic, racial, ethnic, religious, and political factors), as well as to other types of individual attributes such as product interests or organizational affiliations. The Vehicle Type data can be used to specify such things as the make and/or model of the vehicle in which the advertisement should be played and, as described above, this Vehicle Type data can be compared to the stored vehicle data to associate the advertisement with vehicle users likely to be driving that type of vehicle. The Geographic Region data can be used to limit the advertisement to playback to only those users residing in a particular geographic region. For example, advertising can targeted based on the zip code of the vehicle owner/driver.

Once certain advertisements have been selected and stored using the user/vehicle data and the primary selection data from the advertisement header, the secondary selection data is then used to choose a particular advertisement each time an advertising slot appears in the radio broadcast stream currently being played by the user. As shown in FIG. 8, the secondary selection data mostly consists of timing data such as Priority, Time of Day, Frequency, Urgency, and Expiration data. The Priority data can be used to determine which of a number of suitable, stored advertisements should be played. Also, as described above, the Priority data can be compared with the Default Ad Priority associated with a particular in-line default advertisement contained in an advertising slot to decide whether or not the default advertisement should be replaced with one from memory. The Time of Day data can specify whether the advertisement should be played morning, afternoon, or evening, or can be used to limit playback to even more specific time slots. The Frequency data permits the advertiser to specify how often the advertisement should be played until it either expires or has been played a pre-selected number of times. The Urgency data can be used to specify how soon the advertisement should be played after the vehicle or radio is started (e.g., advertisement played within first five minutes of vehicle operation). Finally, the Expiration data permits a cut-off date to be specified after which the advertisement is deleted from the storage device.

Apart from this timing data, the secondary selection data can also include other data items that are used in determining which stored advertisement should be played at any one time. For example, the Length data identifies the length of the advertisement and this can be compared to the Length data accompanying the advertising slot marker. The Channel data can include an identification of one or more of the many different stations available to the user via the radio controls so that a particular advertisement is played on only certain stations. In this regard, it should be noted that an advantage of the advertising approach implemented by the vehicle system 12 is that the individual advertisements can be disassociated from any particular radio station so that a particular advertisement can be played regardless of the station selected by the vehicle user. Also, rather than specifying certain radio stations, the Channel data can specify the type of station with which the advertisement should be played (e.g., classical, alternative rock, jazz). As will be apparent from the above discussion, the secondary selection data is typically compared, not to the user data, but either to similar data from other advertisements (e.g., Priority) or to other data obtained from either the vehicle system (e.g., selected Channel information from the receiver 18) or from an external source (e.g., vehicle clock). In addition to the advertisement data described above, it will be appreciated that additional data items could be included as well, and that many of the listed data items need not necessarily be used in any particular application of the invention.

The advertisement data is stored on the recording device along with the advertisement, although they need not be physically stored together, but merely in a manner that maintains the association of the advertisement data with its advertisement. Furthermore, not all of the advertisement data need be stored. For example, once it is used to determine whether an advertisement should be stored or ignored, the primary selection data could be abandoned (not stored) if it is no longer otherwise needed. The advertisement data, as well as the other data shown in FIGS. 7 and 9, can be transmitted and stored in digital form as various data types such as integers and text strings and can be stored in various ways using various types of data structures, as will be known to those skilled in the art. Similarly, the advertisements are preferably stored as digital data on the recording device 28. For this purpose, the recording device 28 can be a read/write digital storage device such as a hard disk (or other magnetic media) or a solid-state memory such static, dynamic, or other types of random access memory. ACU 24 can be implemented as a microprocessor-based system and the programming for ACU 24 can be either stored on-chip or on recording device 28, or elsewhere, as desired.

Once an advertisement has been played to the listener, a confirmation is sent to the central facility 16 via the communications device 26. As shown in FIG. 9, this confirmation 74 can include one or more various pieces of information about the advertisement and its playback. For example, the data returned can include: a Customer ID that uniquely identifies the particular subscriber to the system; the Ad ID and/or Billing Code taken from the advertisement data; a Timestamp of when the advertisement was played; and the Station over which the advertisement was played. This information can be used for billing purposes and as survey information for such uses as setting future advertising prices, determining audience size for particular stations, and improving the targeting of advertising in the future. Apart from confirming successful playback of a particular advertisement, the telemetry data returned to the central facility can include a Product Information Request, which can be initiated by the vehicle user during playback of the advertisement to request additional information concerning the product, as by way of an email message using an email address previously provided by that subscriber. Moreover, as shown in FIGS. 2 and 3, the current playlist (e.g., music) being played over the radio at any one time can be supplied to the communications device 26 so that the user can request purchasing or other information concerning particular music being played, with the communications device using the Product Information Request field to specify the song for which additional information is desired. Again, the user's email address can be used to supply the additional information.

Additional advertisement data or other information contained within the vehicle system can be included in the confirmation 74 that is returned to the central facility 16. Also, any of the data accompanying the marker 68 can be included in addition to or in lieu of the confirmation data shown in FIG. 9. For example, the Slot ID could be returned instead of a Timestamp with the Slot ID being checked against data from the transmitting facility 14 to determine when and over what station the advertising slot had been sent. Also, the confirmation 74 can be sent back in real time when the advertisement is played, or the confirmation data can be aggregated for multiple advertisements and sent back in batches at predefined times or intervals.

It will thus be apparent that there has been provided in accordance with the present invention a radio broadcast system which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, where there may be multiple drivers of a particular vehicle, different sets of user data can be stored in the vehicle system 12 and any of a number of known techniques for differentiating among the drivers can be used to determine which set of user data to utilize. Thus, a coded ignition key that identifies one driver from another can be used to select which user data set to use. Similarly, unique codes from different remote transmitter key fobs can be used for this purpose. All such variations and modifications are intended to come within the scope of the appended claims.

I claim:

1. A radio system for a vehicle to provide broadcasted radio programming and advertising content to an occupant of a vehicle, comprising:

a vehicle radio having an input for receiving audio data and at least one output for providing audio signals representative of the received audio data;

a radio broadcast receiver having an antenna for receiving two or more radio broadcast streams, with a first one of the radio broadcast streams including radio advertisements and a second one of the radio broadcast streams including audio content that contains intermittent advertising slots each identified by a marker contained with that broadcast stream, the radio broadcast receiver being coupled to the input of the vehicle radio to provide the vehicle radio with the received audio content; and an advertising control unit connected to said radio broadcast receiver to receive at least some of the radio advertisements contained in the first radio broadcast stream, said advertising control unit including a recording device which stores radio advertisements received from said radio broadcast receiver;

wherein, upon receipt of one of the markers contained within the second broadcast stream, said advertising control unit is operable to access one of the stored radio advertisements, with the accessed radio advertisement being inserted into the advertising slot identified by the received marker so that the accessed radio advertising is included within the audio content sent to the input of the vehicle radio.

2. The radio system as defined in claim 1, wherein the vehicle radio and radio broadcast receiver are integrated together as a single unit.

3. The radio system as defined in claim 1, wherein the vehicle radio, radio broadcast receiver, and advertising control unit are integrated together as a single unit.

4. The radio system as defined in claim 1, wherein said recording device comprises a digital storage device.

5. The radio system as defined in claim 1, wherein said digital storage device comprises random access memory.

6. The radio system as defined in claim 1, wherein the radio broadcast receiver is connected to the input of the vehicle radio and wherein the advertising control unit is operable to supply the accessed radio advertisement to the radio broadcast receiver for insertion into the audio content by the radio broadcast receiver.

7. The radio system as defined in claim 6, wherein said radio broadcast receiver is operable to provide the markers to said advertising control unit, and said advertising control unit is operable in response to receiving one of the markers to access one of the radio advertisements and supply the accessed radio advertisement to the radio broadcast receiver.

8. The radio system as defined in claim 1, wherein the radio broadcast receiver is coupled to the input of the vehicle radio by the advertising control unit such that the first and second radio broadcast streams are sent by the radio broadcast receiver to the advertising control unit, and wherein the advertising control unit is operable to store on the recording device at least some of the radio advertisements contained in the first radio broadcast stream, and is further operable to monitor the second radio broadcast stream for the markers and to insert the accessed radio advertisement into one of the advertising slots following receipt of the marker that identifies that advertising slot.

9. The radio system as defined in claim 1, wherein said advertising control unit is operable to select one or more of the received radio advertisements using advertisement data that accompanies each of the radio advertisements received by the radio broadcast receiver.

10. The radio system as defined in claim 9, wherein said advertising control unit is operable to store the selected radio advertisements on said recording device.

11. The radio system as defined in claim 9, wherein the advertisement data contains selection data used by the advertising control unit to select among the received radio advertisements.

12. The radio system as defined in claim 11, wherein the selection data includes primary selection data and secondary selection data and wherein said advertising control unit is operable to select and store certain ones of the different radio advertisements using the primary selection data, and is further operable to select one of the stored radio advertisements using the secondary selection data and to then access that stored radio advertisement for insertion into the audio content sent to the input of the vehicle radio.

13. The radio system as defined in claim 12, wherein the advertising control unit is operable to store each of the secondary selection data with its associated radio advertisement in the recording device.

14. The radio system as defined in claim 9, wherein said advertising control unit contains stored vehicle data and is operable to select one or more of the received radio advertisements using the advertisement data and the stored vehicle data.

15. The radio system as defined in claim 9, wherein said advertising control unit contains stored user data and is operable to select one or more of the received radio advertisements using the advertisement data and the stored user data.

16. The radio system as defined in claim 15, further comprising a vehicle communications device connected to said advertising control unit to provide said advertising control unit with the user data.

17. The radio system as defined in claim 9, further comprising a vehicle communications device operable to transmit identification data received from the first radio broadcast stream that uniquely identifies the accessed radio advertisement from among the other radio advertisements.

* * * * *